United States Patent
Tait

(10) Patent No.: US 11,059,407 B2
(45) Date of Patent: Jul. 13, 2021

(54) CUSHION LENGTH ADJUSTER

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/660,202

(22) Filed: Oct. 22, 2019

(65) Prior Publication Data
US 2021/0114496 A1 Apr. 22, 2021

(51) Int. Cl.
*A47C 3/00* (2006.01)
*B60N 2/90* (2018.01)
*B60N 2/02* (2006.01)

(52) U.S. Cl.
CPC ........... *B60N 2/914* (2018.02); *B60N 2/0284* (2013.01)

(58) Field of Classification Search
CPC ........ B60N 2/914; B60N 2/62; B60N 2/0284; B60N 2/72; B60N 2/0232; B60N 2/646; Y10S 297/03; A47C 7/14
USPC ..... 297/284.11, 284.6, 284.3, 284.1, 344.13, 297/DIG. 3
See application file for complete search history.

(56) References Cited

U.S. PATENT DOCUMENTS

| | | | | |
|---|---|---|---|---|
| 4,541,669 A * | 9/1985 | Goldner | ............ | B60N 2/62 297/284.11 |
| 4,773,703 A * | 9/1988 | Krugener | ............ | B60N 2/0284 297/284.1 |
| 5,082,326 A | 1/1992 | Sekido | | |
| 5,647,635 A * | 7/1997 | Aumond | ............ | B60N 2/62 297/284.1 |
| 9,039,085 B2 * | 5/2015 | Aselage | ............ | B60N 2/0284 297/284.3 |
| 9,399,418 B2 * | 7/2016 | Line | ............ | B60N 2/995 |
| 9,994,135 B2 * | 6/2018 | Line | ............ | B60N 2/22 |
| 10,703,225 B2 * | 7/2020 | Ito | ............ | B60N 2/0232 |
| 10,773,624 B2 * | 9/2020 | Morrow | ............ | B60N 2/686 |
| 2006/0152053 A1 * | 7/2006 | Kim | ............ | A47C 7/14 297/312 |
| 2008/0231099 A1 * | 9/2008 | Szczepkowski | ....... | A47C 7/029 297/284.11 |
| 2013/0320730 A1 * | 12/2013 | Aselage | ............ | B60N 2/0284 297/337 |
| 2016/0236594 A1 * | 8/2016 | Dry | ............ | B60N 2/36 |
| 2018/0056836 A1 * | 3/2018 | Schacht | ............ | B60N 2/914 |
| 2019/0106035 A1 * | 4/2019 | Goto | ............ | B60N 2/646 |

FOREIGN PATENT DOCUMENTS

| | | |
|---|---|---|
| EP | 2230970 | 9/2010 |
| WO | 2014138865 | 9/2014 |
| WO | 2015020433 | 2/2015 |

* cited by examiner

*Primary Examiner* — Chi Q Nguyen
(74) *Attorney, Agent, or Firm* — Barnes & Thornburg LLP

(57) ABSTRACT

An occupant support having a seat cushion. The seat cushion includes a rear pad and a front pad selectively movable with respect to the rear pad between a retracted position and an extended position.

17 Claims, 4 Drawing Sheets

CUSHION LENGTH ADJUSTER

BACKGROUND

The present disclosure relates to an occupant support, and particularly to a vehicle seat. More particularly, the present disclosure relates to a seat cushion of a vehicle seat having a rear pad and a front pad selectively movable with respect to the rear pad.

SUMMARY

According to the present disclosure, an occupant support includes a seat bottom having seat cushion. The seat cushion includes a rear pad and a front pad that is selectively movable with respect to the rear pad between a retracted position and an extended position with a gap between the front pad and the rear pad when the front pad is in an extended position.

In illustrative embodiments, the seat bottom includes a gap filler located in the gap between the rear pad and the front pad of the seat cushion. The gap filler is selectively expandable and retractable. The gap filler expands and continuously fills the gap between the rear pad and the front pad as the front pad moves outwardly with respect to the rear pad toward an extended position, and the gap filler retracts and continuously fills the gap between the rear pad and the front pad as the front pad moves inwardly with respect to the rear pad toward a retracted position.

In illustrative embodiments, the gap filler comprises a pneumatic bladder that is selectively inflatable and deflatable. The bladder is inflatable as the front pad moves outwardly away from the rear pad toward an extended position such that the bladder continuously fills the gap between the rear pad and the front pad as the front pad moves toward an extended position. The bladder is deflatable as the front pad moves inwardly toward the rear pad and toward a retracted position such that the bladder continuously fills the gap between the rear pad and the front pad as the front pad moves toward a retracted position.

In illustrative embodiments, the gap filler includes a top surface that provides support to the occupant when the front pad is in a fully retracted position with respect to the rear pad, the front pad is in a fully extended position with respect to the rear pad, and the front pad is in any position therebetween.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

An occupant support, such as a vehicle seat 10, in accordance with the present disclosure, is shown in FIGS. 1-8. Vehicle seat 10 is adapted to support an occupant thereon. Vehicle seat 10 includes a seat bottom 12 and a seat back 14 extending upwardly from a proximal end of seat bottom 12. The proximal end of an element is generally located more closely to a rear end of seat bottom 12 and to the seat bight of seat 10 than is the distal end of the element, and the distal end of an element is generally located outwardly farther from the rear end of seat bottom 12 and the seat bight than is the proximal end of the element. Seat bottom 12 is adapted to be coupled to the floor of a vehicle.

Figure 1:
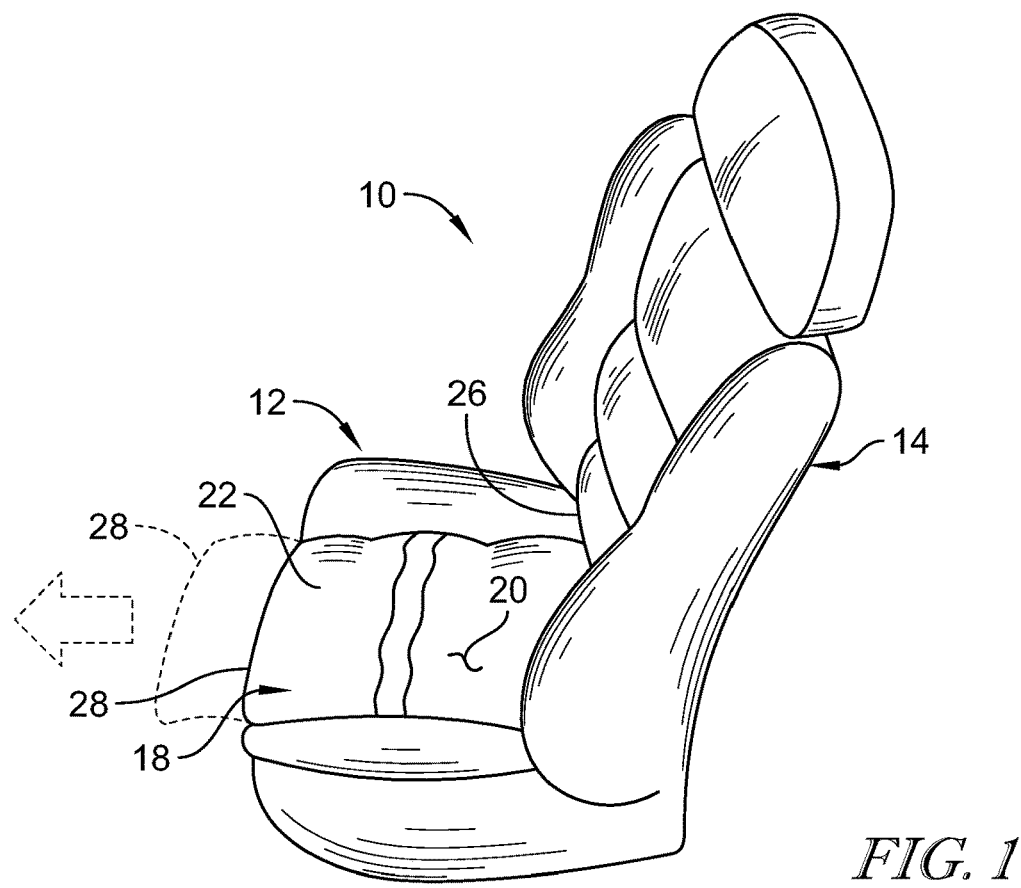
FIG. 1 is a perspective and diagrammatic view, in accordance with the present disclosure, showing an occupant support including a seat back and a seat bottom having a seat cushion including a rear pad and a front pad that is extendable and retractable with respect to the rear pad.
Figure 2:
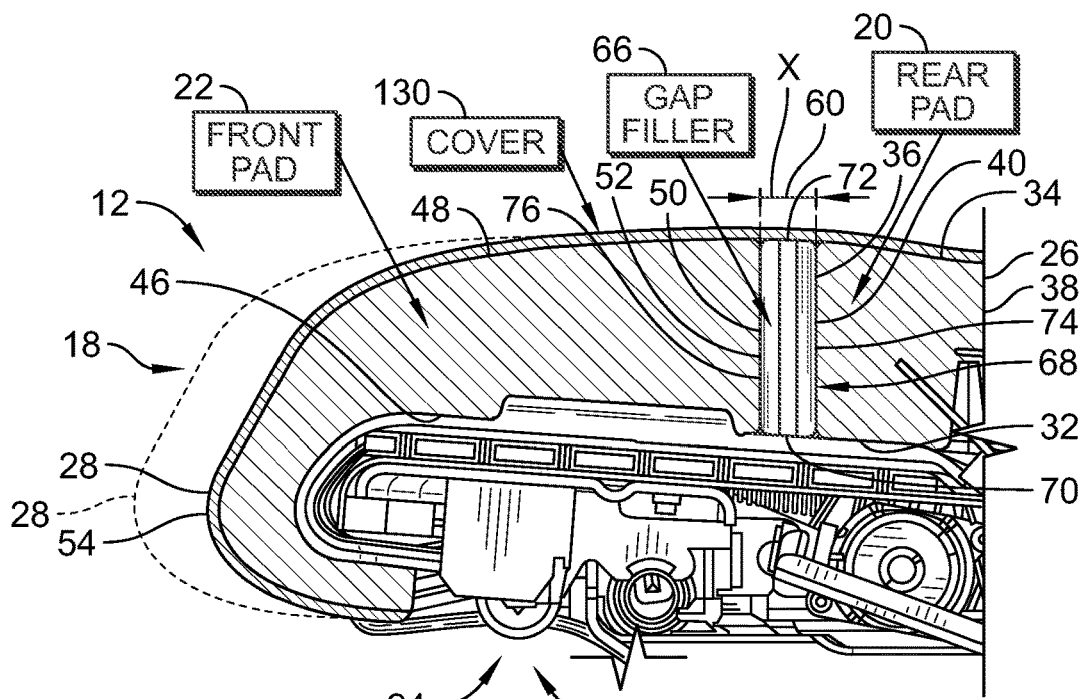
FIG. 2 is a partial cross sectional view of the seat bottom of the occupant support showing the front pad of the seat cushion in a retracted position with respect to the rear pad of the seat cushion, a gap filler located between the front pad and rear pad in a collapsed condition, and an elastic biasing member connecting the front pad to the rear pad.

Seat bottom 12 of vehicle seat 10 includes a seat cushion 18 having a fixed rear pad 20 and a movable front pad 22 that is selectively movable with respect to rear pad 20 between a retracted position and an extended position. Seat bottom 12 also includes a cushion length adjuster 24, as shown in FIG. 2, adapted to selectively linearly move or translate front pad 22 with respect to rear pad 20 in a longitudinal direction between the retracted position and the extended position of front pad 22. Seat cushion 18 extends in a longitudinal direction between a proximal end 26 and a distal end 28.

Rear pad 20 of seat cushion 18 includes a bottom surface 32 and a top surface 34 spaced apart from and located above bottom surface 32. Bottom surface 32 and top surface 34 extend transversely between left and right ends of rear pad 20. Rear pad 20 includes a generally planar distal end wall 36 that extends generally vertically between bottom surface 32 and top surface 34. Rear pad 20 extends in a longitudinal direction between a proximal end 38 located adjacent proximal end 26 of seat cushion 18 and a distal end 40 located adjacent distal end wall 36 of rear pad 20.

Front pad 22 of seat cushion 18 includes an interior bottom surface 46 and a spaced apart outer top surface 48 located vertically and outwardly from bottom surface 46. Front pad 22 includes a generally planar proximal end wall 50 that extends generally vertically between bottom surface 46 and top surface 48 of front pad 22. Front pad 22 extends in a longitudinal direction between a proximal end 52 located adjacent proximal end wall 50 and a distal end 54 located adjacent distal end 28 of seat cushion 18. Rear pad 20 and front pad 22 may be formed from an elastic material, such as foam.

Figure 3:
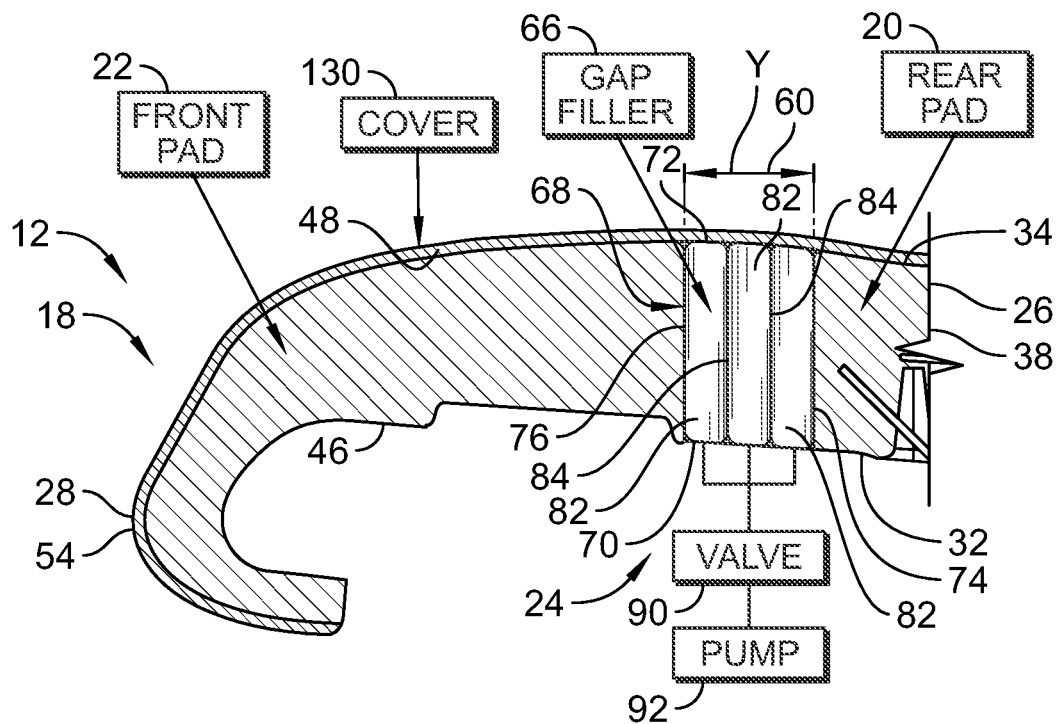
FIG. 3 is a partial cross sectional view of the seat bottom of the seat cushion showing the front pad of the seat cushion in an extended position with respect to the rear pad of the seat cushion, the gap filler in an expanded condition and extending between the rear pad and front pad, and the elastic biasing member in an elongated stretched condition.

As illustrated in FIGS. 2 and 3, cushion length adjuster 24 is adapted to selectively slidably move or translate front pad 22 with respect to rear pad 20 in a longitudinal linear direction between a retracted position as shown in FIG. 2 and an extended position as shown in FIG. 3. As shown in FIG. 2, when front pad 22 is in the retracted position with respect to rear pad 20, a gap 60 extends longitudinally between distal end wall 36 of rear pad 20 and proximal end wall 50 of front pad 22, and between distal end 40 of rear pad 20 and proximal end 52 of front pad 22. Gap 60 extends a selected distance "X" between rear pad 20 and front pad 22 when front pad 22 is in a fully retracted position. As shown in FIG. 3, cushion length adjuster 24 linearly moved or translated front pad 22 outwardly from rear pad 20 to an extended position with respect to rear pad 20. As shown in FIG. 3, the longitudinal length of gap 60 between distal end wall 36 of rear pad 20 and proximal end wall 50 of front pad 22, and between distal end 40 of rear pad 20 and proximal end 52 of front pad 22, increases in length, when front pad 22 is in an extended position, to a distance "Y" which is greater than distance "X." Cushion length adjuster 24 may move front pad 22 a selected distance, such as from about two inches to about six inches or more, with respect to rear pad 20. Distance "Y" may be greater than distance "X" by from about zero inches to about six inches or more. Gap 60 extends longitudinally between rear pad 20 and front pad 22 and transversely across the width of seat cushion 18.

Cushion length adjuster 24, as shown in FIGS. 2 and 3, includes an expandable and retractable gap filler 66 that extends between distal end wall 36 of rear pad 20 and proximal end wall 50 of front pad 22, and between distal end 40 of rear pad 20 and proximal end 2 of front pad 22, such that gap filler 66 fills gap 60 between rear pad 20 and front pad 22 when front pad 22 is located in a fully retracted position with respect to rear pad 20, a fully extended position with respect to rear pad 20, and any position therebetween.

Gap filler 66 may comprise a selectively inflatable and expandable, and selectively deflatable and retractable, pneumatic bladder 68. Gap filler 66 may comprise one or more bladders 68. Bladder 68 includes a bottom wall 70 and a top wall 72 spaced apart from and located above bottom wall 70. Bladder 68 also includes a proximal end wall 74 that extends between bottom wall 70 and top wall 72 and that extends along and adjacent distal end wall 36 of rear pad 20. Bladder 68 also includes a distal end wall 76 that extends between bottom wall 70 and top wall 72 and that extends along and adjacent to proximal end wall 50 of front pad 22. Proximal end wall 74 of bladder 68 may be coupled to distal end wall 36 of rear pad 20, and distal end wall 76 of bladder 68 may be coupled to proximal end wall 50 of front pad 22. Bladder 68 also includes a first sidewall 78 and a spaced apart second sidewall 80. Bottom wall 70, top wall 72, proximal end wall 74 and distal end wall 76 extend between first sidewall 78 and second sidewall 80.

Bladder 68 may include one or more hollow chambers 82 formed by and located within bottom wall 70, top wall 72, proximal end wall 74, distal end wall 76, first sidewall 78 and second sidewall 80. If desired, bladder 68 may include one or more internal walls 84 that form a plurality of individual chambers 82 within bladder 68. Internal walls 84 may extend between bottom wall 70 and top wall 72 of bladder 68 and may be spaced apart from one another between proximal end wall 74 and distal end wall 76. Each chamber 82 is adapted to be gas tight. Bladder 68 may be formed from a plastic material such as thermoplastic polyurethane (TPU). Gap filler 66 may also comprise a resiliently compressible foam material.

Figure 4:
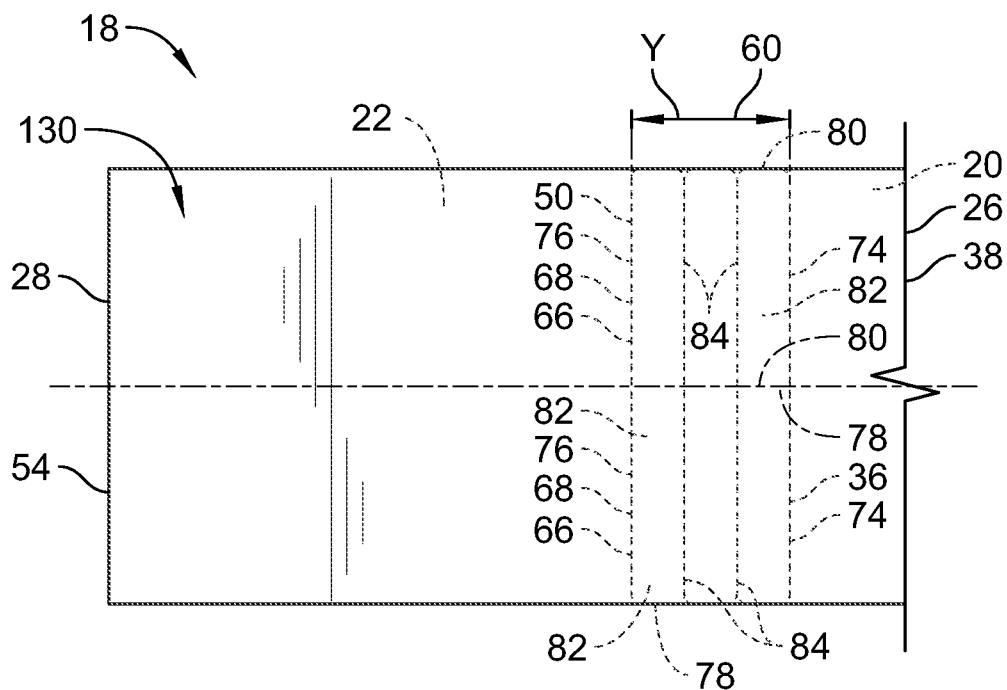
FIG. 4 is a partial top plan view of the seat cushion as shown in FIG. 3.

As shown in FIGS. 2 and 3, top wall 72 of bladder 68 is adapted to extend between and be generally coplanar with top surface 34 of rear pad 20 and top surface 48 of front pad 22. A single bladder 68 may extend longitudinally between distal end 40 of rear pad 20 and proximal end 52 of front pad 22, and transversely between the left side and right side seat cushion 18 to fill gap 60. Alternatively, as shown in FIG. 4, two or more bladders 68 may be located adjacent to one another in a side-by-side relationship transversely across the width of seat cushion 18 and that extend between distal end 40 of rear pad 20 and proximal end 52 of front pad 22 to fill gap 60. Alternatively, two or more bladders 68 may be located adjacent to one another in a front-to-back relationship in a longitudinal direction between distal end 40 of rear pad 20 and proximal end 52 of front pad 22 to fill gap 60. Other combinations of bladders 68 may be used as desired.

Bladder 68 is adapted to inflate and expand as front pad 22 is extended with respect to rear pad 20, with proximal end wall 74 of bladder 68 remaining in engagement with distal end wall 36 of rear pad 20 and with distal end wall 76 of bladder 68 remaining in engagement with proximal end wall 50 of front pad 22, such that bladder 68 continuously fills gap 60 regardless of the position of front pad 22 with respect to rear pad 20. Similarly, bladder 68 is adapted to deflate and collapse as front pad 22 is retracted toward rear pad 20 with proximal end wall 74 of bladder 68 remaining in engagement with distal end wall 36 of rear pad 20, and with distal end wall 76 of bladder 68 remaining in engagement with proximal end wall 50 of front pad 20, such that bladder 68 continuously fills gap 60.

Top surface 34 of rear pad 20, top surface 48 of front pad 22, and the top surface of top wall 72 of bladder 68 provide support to the legs of an occupant when front pad 22 is in the fully retracted position with respect to rear pad 20, is in the fully extended position with respect to rear pad 20, and is in any position therebetween. Top wall 72 of bladder 68 provides support to the legs of the occupant between rear pad 20 and front pad 22 regardless of the position of front pad 22 with respect to rear pad 20.

Cushion length adjuster 24 includes a valve 90 coupled in fluid communication with each chamber 82 of bladder 68, and a pump 92 coupled in fluid communication with valve 90. Valve 90 is adapted to selectively allow pump 92 to pump a gas, such as air, through valve 90 into each chamber 82 of bladder 68 to thereby fill chambers 82 of bladder 68 with pressurized gas and thereby inflate and expand bladder 68. The gas within each chamber 82 may be pressurized to a pressure of, for example, approximately 14.7 pounds per square inch (psi). Valve 90 is also adapted to selectively allow pump 92 to withdraw gas from chambers 82 of bladder 68 through valve 90 thereby creating a negative air pressure or vacuum within chambers 82 to thereby deflate and collapse bladder 68.

Front pad 22 may be moved from a retracted position toward an extended position with respect to rear pad 20 by pump 92 pumping gas into chambers 82 of bladder 68 through valve 90 and thereby expanding bladder 68 in the longitudinal direction such that distal end wall 76 of bladder 68 is located a further distance from proximal end wall 74 of bladder 68. In addition, front pad 22 may be moved from an extended position toward a retracted position with respect to rear pad 20 by pump 92 withdrawing gas from chambers 82 of bladder 68 through valve 90 to deflate bladder 68 and thereby collapse and retract bladder 68, such that distal end wall 76 of bladder 68 moves closer toward proximal end wall 74 of bladder 68. Bladder 68, valve 90 and pump 92 comprise an actuator for selectively moving front pad 22 with respect to rear pad 20.

Figure 8:
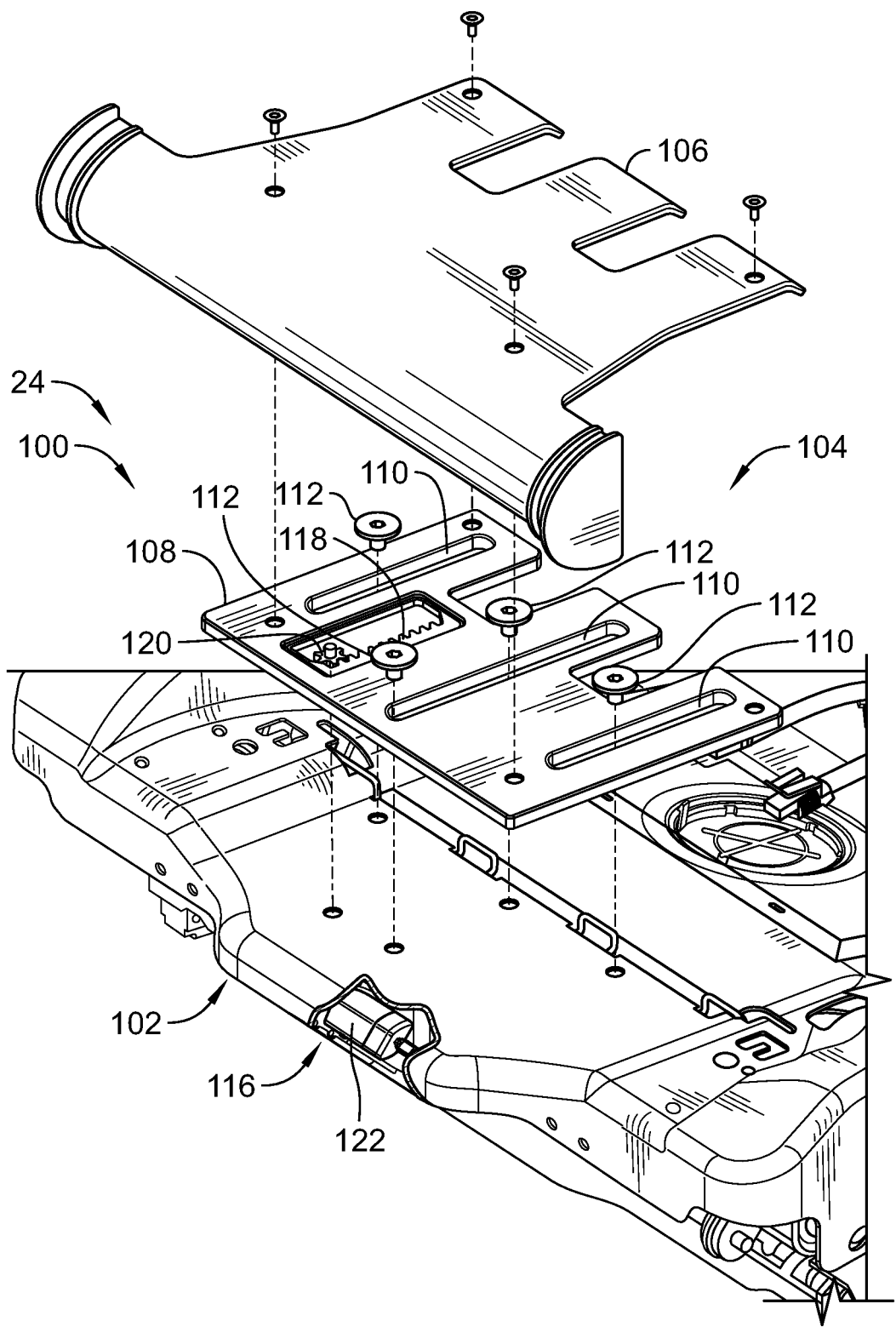
FIG. 8 is a partial perspective exploded view of an adjustable base of a cushion length adjuster.

Cushion length adjuster 24 may also include an adjustable base 100 as shown in FIGS. 2 and 8. Adjustable base 100 includes a fixed frame 102 adapted to be coupled to the floor of the vehicle and a movable frame 104 movably and slidably coupled to frame 102, as shown in FIG. 8, such that movable frame 104 may be selectively slidably moved or translated in a longitudinal direction with respect to fixed frame 102. Movable frame 104 includes a movable seat pan 106 coupled to front pad 22 of seat cushion 18, and a pan mount 108 coupled to movable frame 104 and operatively and slidably coupled to fixed frame 102. Pan mount 108 includes one or more elongate generally linear guide slots 110. Guide slots 110 are generally parallel to one another and extend in the longitudinal direction of vehicle seat 10. Fixed frame 102 includes one or more guide pins 112. Each guide slot 110 is adapted to receive one or more guide pins 112 such that guide pins 112 slidably couple pan mount 108 to fixed frame 102, while allowing selective longitudinal slidable movement of pan mount 108 and movable seat pan 106 with respect to fixed frame 102. Guide pins 112 prevent transverse movement of pan mount 108 and seat pan 106 with respect to fixed frame 102.

Adjustable base 100 includes an actuator 116 that is adapted to selectively linearly slide movable frame 104 and front pad 22 between a retracted position of front pad 22 and an extended position of front pad 22 with respect to rear pad 20. In the illustrative embodiment, actuator 116 includes a rack 118, a pinion 120, and a motor 122. Rack 118 is formed in pan mount 108 and includes a series of teeth that are coupled to a sidewall in an aperture of pan mount 108. Rack 118 extends in a longitudinal direction of seat cushion 18. Pinion 120 includes a plurality of teeth arranged in a circular manner and that are adapted to engage and interlock with the teeth of rack 118. Pinion 120 is adapted to selectively rotate about a central pinion axis in a clockwise direction or a counter-clockwise direction as desired to provide desired movement of movable frame 104 and front pad 22 from a retracted position toward an extended position with respect to rear pad 20, or from an extended position toward a retracted position with respect to rear pad 20. Pinion 120 is operatively coupled to motor 122 such that motor 122 provides the desired rotation of pinion 120 to extend or retract front pad 22 with respect to rear pad 20 as may be desired.

If desired, bladder 68, valve 90 and pump 92 may provide the sole actuating force for selectively jointly moving front pad 22 from a retracted position toward an extended position, and from an extended position toward a retracted position, with respect to rear pad 20. Alternatively, actuator 116 of adjustable base 100 may provide the sole actuating force for selectively moving front pad 22 between a retracted position and an extended position of front pad 22 with respect to rear pad 20. Alternatively, bladder 68, valve 90, pump 92 and actuator 116 may work in combination with each other to selectively move front pad 22 between retracted and extended positions of front pad 22 with respect to rear pad 20.

Seat cushion 18 may include an elastic biasing member such as an elastic cover 130 formed from an elastic material. As illustrated in FIGS. 2-4, elastic cover 130 is coupled to rear pad 20 and front pad 22 and extends between rear pad 20 and front pad 22. Cover 130 may extend along and cover the entire top surface 34 of rear pad 20, top surface 48 of front pad 22 and top wall 72 of gap filler 66, or just portions thereof as may be desired. Cover 130 is adapted to be resiliently stretched when front pad 22 is moved toward an extended position with respect to rear pad 20. Cover 130 is adapted to provide a retraction biasing force to front pad 22 that biases front pad 22 toward rear pad 20 and that biases front pad 22 from an extended position toward a retracted position of front pad 22. Cover 130 is elastic and stretchable to thereby allow front pad 22 to be moved from the retracted position toward an extended position with respect to rear pad 20. A skin may be placed over cover 130, rear pad 20, front pad 22 and bladder 68 to form an outer surface of seat cushion 18.

Figure 5:
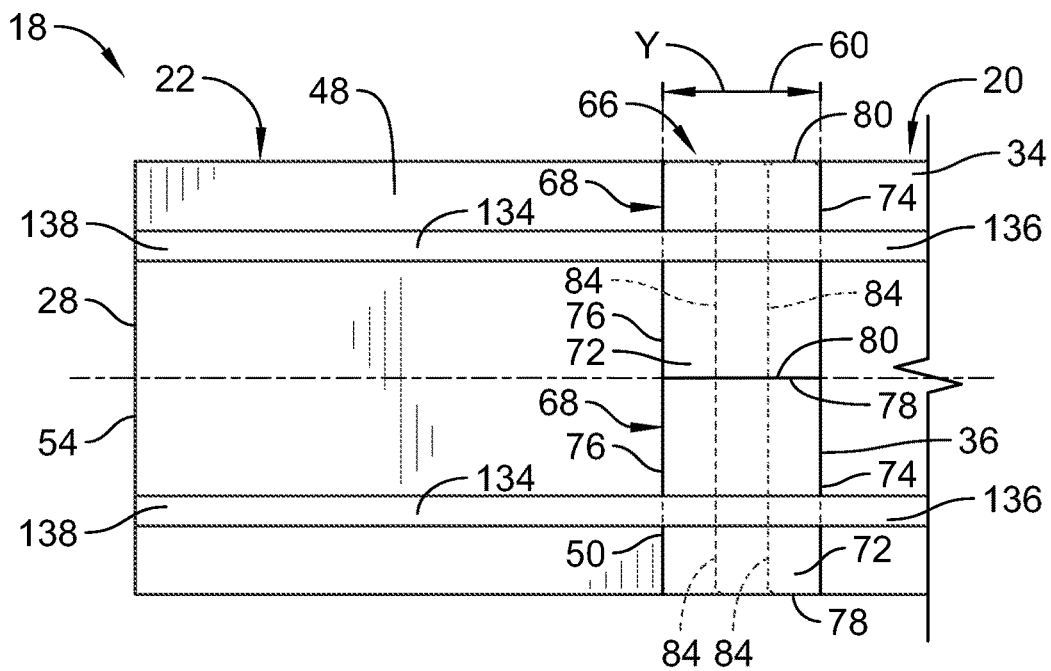
FIG. 5 is a partial top plan view of the seat cushion having another embodiment of the resilient biasing member including two elongate elastic straps.

An alternate embodiment of the elastic biasing member of seat cushion 18 is shown in FIG. 5, wherein the elastic biasing member comprises one or more elongate elastic straps 134. Each strap 134 extends between a first end 136 and a second end 138. First ends 136 of straps 134 are coupled to rear pad 20 and second ends 138 of straps 134 are coupled to front pad 22. Straps 134 are made from an elastic material. Straps 134 are adapted to stretch as front pad 22 is moved from a retracted position toward an extended position with respect to rear pad 20. Elastic straps 134 are also adapted to provide a retraction biasing force to front pad 22 that is adapted to bias front pad 22 from an extended position toward a retracted position and toward rear pad 20, to assist in retracting front pad 22 with respect to rear pad 20. Other types of elastic biasing members, such as cords and springs that connect front pad 22 to rear pad 20 may be used for providing a resilient retraction biasing force to front pad 22.

Figure 6:
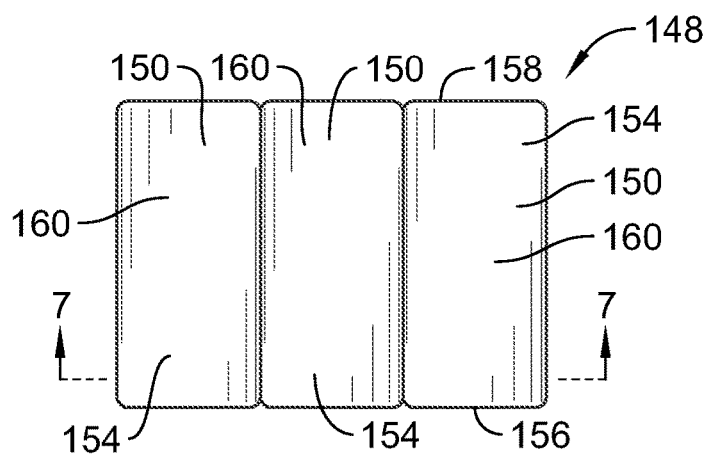
FIG. 6 is a top plan view of another embodiment of the gap filler.
Figure 7:
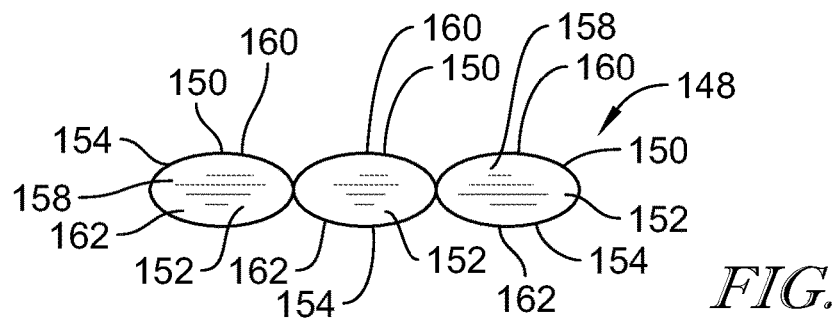
FIG. 7 is a cross sectional view of the gap filler taken along lines 7-7 of FIG. 6.

An alternate embodiment of bladder 68 is shown in FIGS. 6 and 7 as bladder 148. Bladder 148 includes a plurality of generally elliptical-shaped elongate hollow tubes 150. Each tube 150 includes a hollow gas-tight chamber 152 adapted to be coupled in fluid communication with valve 90. Each tube 150 includes a generally elliptical-shaped sidewall 154 which extends between a first end wall 156 and a second end wall 158. Each sidewall 154 includes a generally convex top surface 160 and a generally convex bottom surface 162. Sidewalls 154 of adjacent tubes 150 are connected to one another. Bladder 148 is adapted to be located in gap 60 and is adapted to be selectively expandable and retractable within gap 60 such that bladder 148 fills gap 60 as front pad 22 is selectively moved between a retracted position and an extended position with respect to rear pad 20 in the same manner as bladder 68.

In operation, front pad 22 may be slidably moved with respect to rear pad 20 in a longitudinal direction from a retracted position of front pad 22, as shown in FIG. 2, toward an extended position of front pad 22, as shown in FIG. 3, by inflating bladder 68 with pressurized gas from pump 92 through valve 90 and, if desired, by actuator 116 providing sliding movement of movable frame 104 with respect to fixed frame 102. Pump 92 pumps compressed gas into chambers 82 of bladder 68 such that bladder 68 expands in a longitudinal direction and fills gap 60 between rear pad 20 and front pad 22 as front pad 22 moves outwardly with respect to rear pad 20.

Pressurized gas within chambers 82 of bladder 68 is withdrawn or vented from chambers 82 by pump 92 through valve 90, such that gas within chambers 82 is at a negative atmospheric pressure, whereby bladder 68 contracts and bladder 68 thereby moves front pad 22 in a direction toward rear pad 20, from an extended position toward a retracted position with respect to rear pad 20. If desired, valve 90 may selectively vent gas from chambers 82 of bladder 68 to the atmosphere, without the assistance of pump 92, when front pad 22 is moved from an extended position toward a retracted position such as by actuator 116 of adjustable base 100 and/or by elastic cover 130.

Gap filler 66 fills gap 60 between front pad 22 and rear pad 20 when front pad 22 is in a fully retracted position, a fully extended position, or any position therebetween, with respect to rear pad 20, such that top wall 72 of gap filler 66 provides support to the legs of an occupant regardless of the position of front pad 22 with respect to rear pad 20. Gap filler 66 provides increased comfort to the occupant when front pad 22 is in an extended position with respect to rear pad 20 as opposed to when gap 60 is not otherwise filled by gap filler 66.

The invention claimed is:

1. An occupant support comprising:
   a seat cushion having a first pad and a second pad selectively movable with respect to the first pad between a retracted position and an extended position, the seat cushion having a gap formed between the first pad and the second pad in response to the second pad being in the extended position;
   a gap filler located in the gap between the first pad and the second pad, the gap filler being expandable such that the gap filler extends across the gap between the first pad and the second pad in response to the second pad being in the extended position, and the gap filler being retractable in response to the second pad moving from the extended position toward the retracted position; and
   a seat cover extending between a first top surface of the first pad and a second top surface of the second pad so as to cover a third top surface of the gap filler in response to the second pad being in the extended position and in response to the second pad being in the retracted position,
   wherein an entirety of a longitudinal extent of the seat cover that extends between the first top surface of the first pad and the second top surface of the second pad is located above the gap filler, and
   wherein the gap filler includes an upper surface and the upper surface is generally coplanar with a portion of the first top surface of the first pad and a portion of the second top surface of the second pad.

2. The occupant support of claim 1, wherein the gap filler is selectively inflatable with a gas as the second pad moves from the retracted position toward the extended position of the second pad, and the gap filler is selectively deflatable as the second pad moves toward the retracted position of the second pad.

3. The occupant support of claim 1, wherein the gap filler comprises one or more bladders.

4. The occupant support of claim 3, wherein each bladder includes one or more chambers, each chamber adapted to receive a gas.

5. The occupant support of claim 4, including a valve in fluid communication with the one or more chambers of the bladder, the valve adapted to control the flow of the gas into the one or more chambers of the bladder and out of the one or more chambers of the bladder.

6. The occupant support of claim 5, including a pump in fluid communication with the valve.

7. The occupant support of claim 6, wherein the pump is adapted to supply the gas to the one or more chambers of the bladder to inflate the bladder.

8. The occupant support of claim 6, wherein the pump is adapted to withdraw the gas from the one or more chambers of the bladder to deflate the bladder.

9. The occupant support of claim 6, wherein the pump supplies the gas to the one or more chambers of the bladder to inflate the bladder, whereby the bladder moves the second cushion toward the extended position as the one or more chambers of the bladder are inflated.

10. The occupant support of claim 6, wherein the pump withdraws the gas from the one or more chambers of the bladder to deflate the bladder, whereby the bladder moves the second cushion toward the retracted position as the one or more chambers of the bladder are deflated.

11. The occupant support of claim 1, wherein the seat cover biases the second pad from the extended position toward the retracted position of the second pad.

12. The occupant support of claim 11, wherein the seat cover comprises one or more elastic members extending between the first pad and the second pad.

13. The occupant support of claim 12, wherein each elastic member comprises an elastic strap.

14. The occupant support of claim 1, wherein the gap filler comprises a foam material.

15. The occupant support of claim 1, including a cushion length adjuster having a fixed frame and a movable frame movably coupled to the fixed frame, the movable frame coupled to the second pad such that the second pad is conjointly movable with the movable frame with respect to the fixed frame.

16. The occupant support of claim 15, including an actuator for selectively moving the movable frame and the second pad with respect to the fixed frame and thereby moving the second pad between the retracted position and the extended position of the second pad.

17. An occupant support comprising:
   a seat cushion having a first pad and a second pad selectively movable with respect to the first pad between a retracted position and an extended position, the seat cushion having a gap between the first pad and the second pad in response to the second pad being in the extended position; and
   a gap filler between the first pad and the second pad, the gap filler being expandable such that the gap filler extends across the gap between the first pad and the second pad in response to the second pad being in the extended position, and the gap filler being retractable in response to the second pad moving from the extended position toward the retracted position,
   wherein the gap filler includes one or more bladders adapted to receive a gas, and wherein the gap filler moves the second cushion toward the retracted position as the one or more bladders are deflated.

* * * * *